(12) United States Patent
Joubert et al.

(10) Patent No.: US 12,246,848 B2
(45) Date of Patent: Mar. 11, 2025

(54) CASING SYSTEM CONTAINING A HEAT EXCHANGER FOR REHEATING DIHYDROGEN

(71) Applicant: Airbus Operations SAS, Toulouse (FR)

(72) Inventors: Romain Joubert, Toulouse (FR); Lionel Czapla, Toulouse (FR); Jérôme Milliere, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 45 days.

(21) Appl. No.: 18/335,224

(22) Filed: Jun. 15, 2023

(65) Prior Publication Data

US 2023/0406530 A1 Dec. 21, 2023

(30) Foreign Application Priority Data

Jun. 17, 2022 (FR) ...................................... 2205965

(51) Int. Cl.
*B64D 37/30* (2006.01)
*B64D 37/08* (2006.01)
*B64D 37/34* (2006.01)
*F02C 7/224* (2006.01)

(52) U.S. Cl.
CPC ............. *B64D 37/30* (2013.01); *B64D 37/08* (2013.01); *B64D 37/34* (2013.01); *F02C 7/224* (2013.01)

(58) Field of Classification Search
CPC ...... B64D 37/005; B64D 37/08; B64D 37/30; B64D 37/34; F02C 7/224; F02C 7/25
See application file for complete search history.

(56) References Cited

U.S. PATENT DOCUMENTS

| | | | | |
|---|---|---|---|---|
| 3,133,667 | A | * | 5/1964 | Garrett ..................... F01L 1/00 |
| | | | | 220/88.3 |
| 2022/0163170 | A1 | * | 5/2022 | Bensadoun ............. F17C 13/04 |
| 2022/0178544 | A1 | | 6/2022 | Durand et al. |
| 2022/0397479 | A1 | * | 12/2022 | Shenouda ................. F02C 7/22 |

FOREIGN PATENT DOCUMENTS

| | | |
|---|---|---|
| EP | 4012168 A1 | 6/2022 |
| FR | 3110938 A1 | 12/2021 |

OTHER PUBLICATIONS

French Search Report for corresponding French Patent Application No. 2205965 dated Jan. 31, 2023; priority document.

* cited by examiner

*Primary Examiner* — Scott J Walthour
(74) *Attorney, Agent, or Firm* — Greer, Burns & Crain, Ltd.

(57) ABSTRACT

A casing system mounted between an upstream solenoid valve of an upstream pipe and a downstream solenoid valve of a downstream pipe and which has a casing divided by a separation wall into a first volume which is placed under reduced pressure and a second volume, a heat exchanger which is fixed inside the casing with a first inlet which is arranged in the first volume and which is connected to the upstream pipe and a first outlet which is arranged in the second volume and which is connected to the downstream pipe, and a control unit which closes the solenoid valves if the deviation between two successive values of the pressure in the first volume or in the second volume is greater than a threshold.

8 Claims, 2 Drawing Sheets

CASING SYSTEM CONTAINING A HEAT EXCHANGER FOR REHEATING DIHYDROGEN

CROSS-REFERENCES TO RELATED APPLICATIONS

This application claims the benefit of French Patent Application No. 2 205 965 filed on Jun. 17, 2022, the entire disclosure of which is incorporated herein by way of reference.

FIELD OF THE INVENTION

The present invention relates to a casing system containing a heat exchanger which enables dihydrogen which passes through the heat exchanger to be reheated, and an aircraft comprising such a casing system.

BACKGROUND OF THE INVENTION

In order to reduce the consumption of kerosene in aircraft engines, it is known to use dihydrogen as fuel. The aircraft thus comprises a main supply system which comprises tanks of liquid dihydrogen. In order to be used by the engines, the dihydrogen must be in gaseous form and, to this end, the main supply system comprises heat exchangers which ensure the reheating of the dihydrogen from a hot heat exchange fluid. In order to convey the dihydrogen from the tank to the engine, the main supply system comprises a network of pipes, pumps and valves which extends from the tanks to the engines, passing via the heat exchangers.

In order to limit the risks of incidents linked with the use of dihydrogen, safety systems are used around the heat exchangers. Although the systems currently used are efficient, it is necessary to find new arrangements which are particularly simple to implement.

SUMMARY OF THE INVENTION

An object of the present invention is to provide a casing system which contains a heat exchanger which enables dihydrogen passing through the heat exchanger to be reheated in order to supply an aircraft engine, for example.

To this end, a casing system is proposed and is intended to be between a supply pipe and a discharge pipe in which a heat exchange fluid circulates, the casing system comprising:
- a sealed casing which is divided by a sealed separation wall into a first volume and a second volume which is filled with a gas which is inert with respect to dihydrogen,
- a vacuum pump which is connected in fluid terms to the first volume and which is configured, during operation, to generate the reduced pressure in the first volume,
- an upstream pipe along which an upstream solenoid valve is mounted and which is intended to be connected in fluid terms to a dihydrogen tank,
- a downstream pipe along which a downstream solenoid valve is mounted and which is intended to be connected in fluid terms to an engine,
- a heat exchanger which is fixed inside the casing through the separation wall and which has a first inlet which is connected in fluid terms to the upstream pipe downstream of the upstream solenoid valve and a first outlet which is connected in fluid terms to the downstream pipe upstream of the downstream solenoid valve and which has a second inlet which is intended to be connected in fluid terms to the supply pipe and a second outlet which is intended to be connected in fluid terms to the discharge pipe, wherein the first inlet is arranged in the first volume and the first outlet is arranged in the second volume,
- a first pressure sensor which is arranged in the first volume,
- a second pressure sensor which is arranged in the second volume,
- a control unit which is arranged to receive pressure values measured by the pressure sensors in order to detect, on the one hand, if the deviation in absolute value between two successive values of the pressure in the first volume is less than a first threshold or greater than a second threshold which is greater than or equal to the first threshold and, on the other hand, if the deviation in absolute value between two successive values of the pressure in the second volume is less than another first threshold or greater than another second threshold which is greater than or equal to the other first threshold, and to close the solenoid valves if it detects a deviation in absolute value between two successive pressure values beyond the second threshold in the first volume or the other second threshold in the second volume.

Such a casing system enables the casing to be isolated in the event of a leakage.

Advantageously, the casing comprises in the region of a wall of the first volume a pressure relief valve.

Advantageously, the casing comprises, in the region of a wall of the second volume, an intake which is intended to be connected in fluid terms to a source of inert gas under pressure.

Advantageously, the casing comprises, in the region of a wall of the second volume, a discharge via which the gas can be discharged.

According to a specific embodiment, the separation wall comprises an edge which is fixedly joined to the walls of the casing and which extends inside the first volume, a central wall which extends around the heat exchanger and which is fixedly joined thereto, and a connection wall which extends between the edge and the central wall and which is fixed in abutment against a face of the edge which is orientated towards the second volume and in abutment against a face of the central wall which is orientated towards the second volume.

According to another specific embodiment, the separation wall comprises an edge which is fixedly joined to the walls of the casing and which extends inside the first volume and a central wall which extends around the heat exchanger and which is fixedly joined thereto, wherein the central wall is fixed in abutment against a face of the edge which is orientated towards the second volume.

Advantageously, the casing system comprises for each volume, at least one additional sensor, from a dihydrogen sensor and a dioxygen sensor, which is arranged in the volume, the control unit is arranged to receive additional values of the pressures measured by each additional sensor in order to compare each additional value received in this manner with an additional threshold and to close the solenoid valves if an additional value is greater than the additional threshold.

The invention also proposes an aircraft comprising:
- a dihydrogen tank,
- an engine, a casing system according to one of the preceding variants, wherein the upstream pipe extends between the tank and the first inlet of the heat exchanger, wherein the downstream pipe extends between the first outlet of the heat exchanger and the engine, and a heat exchange fluid circuit which comprises a supply pipe which is connected in fluid terms to the second inlet of the heat exchanger and a discharge pipe which is connected in fluid terms to the second outlet of the heat exchanger.

BRIEF DESCRIPTION OF THE DRAWINGS

The features of the invention mentioned above, and other features, will be better appreciated from a reading of the following description of an embodiment, the description being given with reference to the appended drawings, in which.

DETAILED DESCRIPTION OF THE PREFERRED EMBODIMENTS

Figure 1:
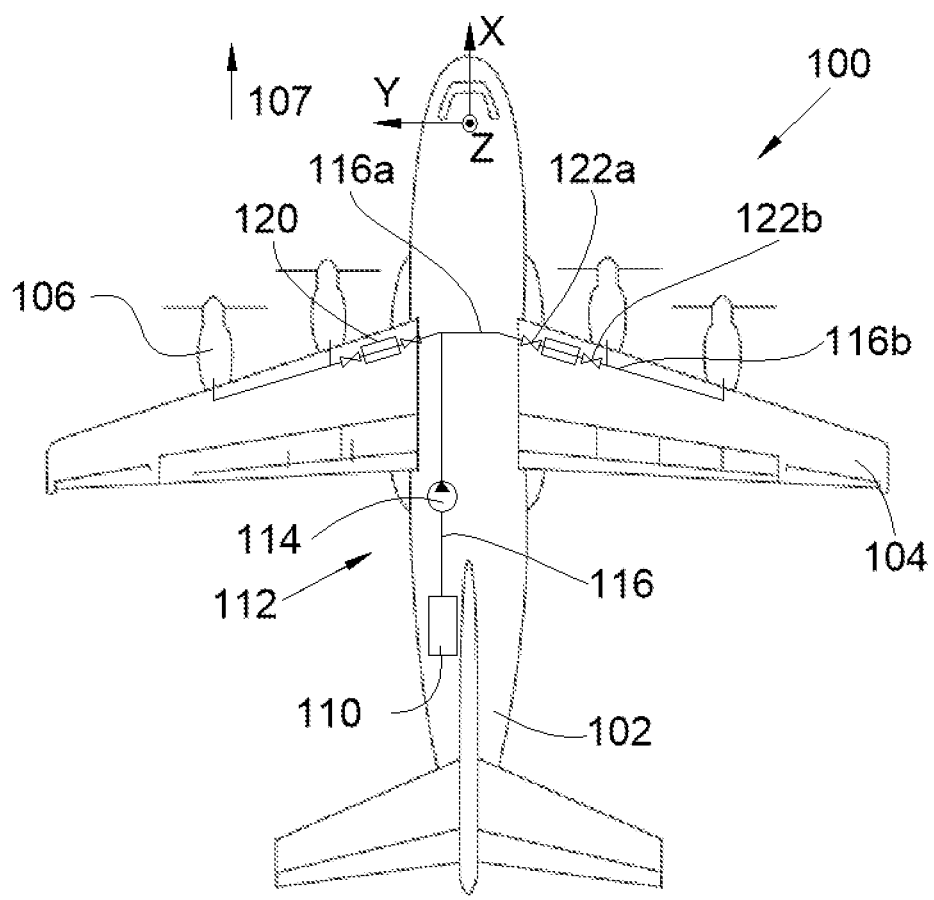
FIG. 1 is a plan view of an aircraft according to the invention.

In the following description, the terms relating to a position are taken with reference to an aircraft in a normal flight position, that is to say, as illustrated in FIG. 1.

In the following description and conventionally, X is used to refer to the longitudinal direction of the aircraft, Y is used to refer to the transverse direction which is horizontal when the aircraft is on the ground, and Z is the vertical direction which is vertical when the aircraft is on the ground, these three directions X, Y and Z being mutually orthogonal.

FIG. 1 shows an aircraft 100 which comprises a fuselage 102 at each side of which a wing 104 which carries at least one engine 106 which operates with gaseous dihydrogen, in particular at 300 K, as fuel is fixed. In the embodiment of the invention set out in FIG. 1, the engine 106 is a helical engine, but any other type of engine may be envisaged.

The arrow 107 indicates the front travel direction of the aircraft 100.

The aircraft 100 comprises a tank 110 in which the dihydrogen is stored in liquid form, in particular at 30 K. In the embodiment of the invention, the tank 110 is arranged at the rear of the fuselage 102, but a different position is possible.

The "upstream" and "downstream" positions extend relative to the flow direction of the fluid. The aircraft 100 also comprises a distribution system 112 which comprises inter alia a pipe 116 which connects the tank to the engine 106 in fluid terms. The distribution system 112 also comprises a pump 114 which is mounted on the pipe 116 in order to drive the dihydrogen at the outlet of the tank 110 in the pipe 116 towards the engine 106.

Before arriving at the engine 106, the dihydrogen passes into a casing system 120 according to the invention which comprises the pipe 116 which supplies the engine 106. The pipe 116 is thus divided into an upstream pipe 116a which extends between the tank 110 and a first inlet of the casing system 120 and a downstream pipe 116b which extends between a first outlet of the casing system 120 and the engine 106.

The casing system 120 comprises the upstream pipe 116a along which an upstream solenoid valve 122a is mounted and the downstream pipe 116b along which a downstream solenoid valve 122b is mounted and the solenoid valves 122a-b are thus upstream of the first inlet and downstream of the first outlet of the casing system 120. When the solenoid valves 122a-b are open, the dihydrogen reaches the region of the upstream solenoid valve 122a, passes through the casing system 120 and is discharged in the region of the downstream solenoid valve 122b in order to supply the engine 106. When the upstream solenoid valve 122a is closed, the dihydrogen does not reach the casing system 120 and, when the downstream solenoid valve 122b is closed, the dihydrogen is not discharged from the casing system 120.

Figure 2:
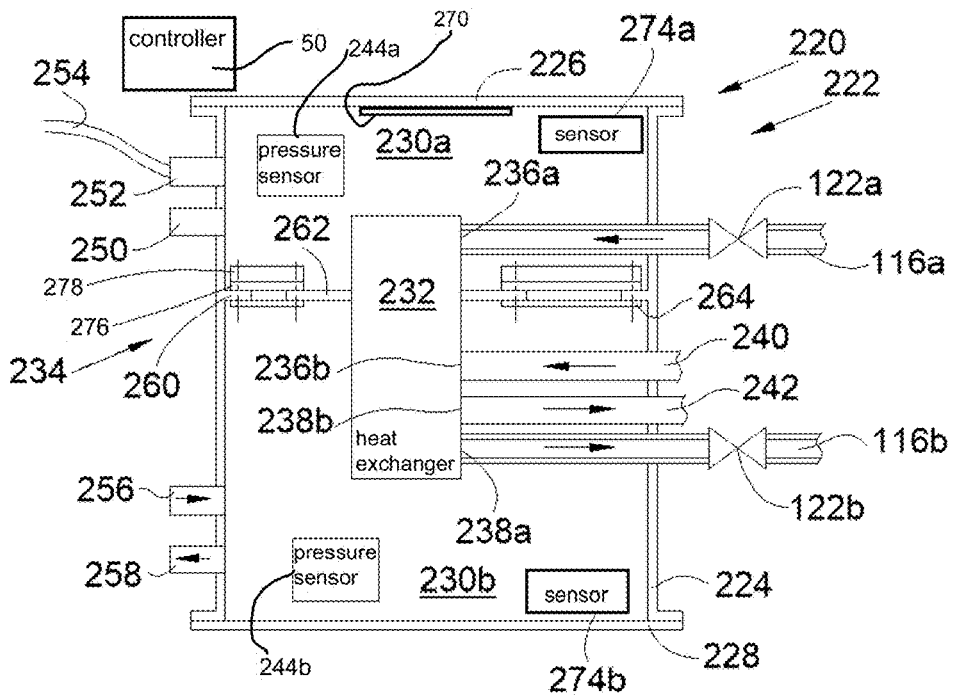
FIG. 2 is a schematic illustration of a casing system according to a first embodiment of the invention.
Figure 3:
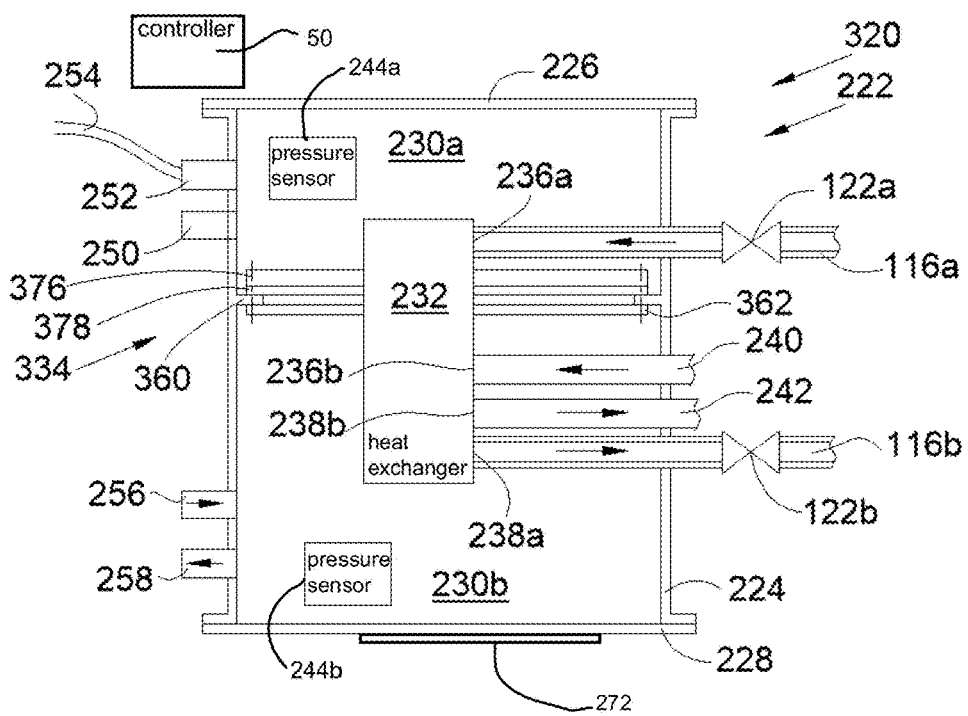
FIG. 3 is a schematic illustration of a casing system according to a second embodiment of the invention.

FIG. 2 shows the casing system 220 according to a first embodiment and FIG. 3 shows the casing system 320 according to a second embodiment.

The casing system 220, 320 comprises a sealed casing 222 which is constituted in this instance by lateral walls 224, a first end wall 226 and a second end wall 228 which are fixed together in a sealed manner in order to delimit an inner volume 230a-b.

The casing system 220, 320 comprises a separation wall 234, 334 which is fixedly joined to the walls, in this instance lateral walls 224, and which separates the inner volume 230a-b into a first volume 230a between the separation wall 234, 334 and the first end wall 226 and a second volume 230b between the separation wall 234, 334 and the second end wall 228.

The separation wall 234, 334 forms a sealed barrier between the two volumes 230a and 230b and may be in different forms of which a first example is illustrated in FIG. 2 and a second example is illustrated in FIG. 3. The casing 222 is thus divided by the separation wall 234, 334 into a first volume 230a and a second volume 230b.

The casing system 220, 320 also comprises a vacuum pump 250 which is connected in fluid terms to the first volume 230a and which, during operation, is arranged to reduce the pressure in the first volume 230a. In this manner, the gases are extracted from the first volume 230a, wherein the pressure reduction is produced and the pressure at that location is reduced.

The second volume 230b is filled with a gas which is inert with regard to dihydrogen, in particular in liquid form, that is to say, there is no risk when mixed with dihydrogen. The inert gas is, for example, dinitrogen.

The casing system 220, 320 comprises a heat exchanger 232 which is fixed inside the casing 222 and which ensures the reheating of the dihydrogen, in particular from 30 K to 300 K.

The heat exchanger 232 comprises a first inlet 236a which is connected in fluid terms to the upstream pipe 116a downstream of the upstream solenoid valve 122a and a first outlet 238a which is connected in fluid terms to the downstream pipe 116b upstream of the downstream solenoid valve 122b. The dihydrogen therefore reaches the heat exchanger 232 via the first inlet 236a and is discharged in a reheated state via the first outlet 238a.

The first inlet 236a is arranged in the first volume 230a and the first outlet 238a is arranged in the second volume 230b and the heat exchanger 232 therefore passes through the separation wall 234, 334 in a sealed manner. There is therefore a first portion of the heat exchanger 232 located in the first volume 230a and a second portion of the heat exchanger 232 located in the second volume 230b.

In order to reach the first inlet 236a, the upstream pipe 116a extends in a sealed manner through a wall, in this instance a lateral wall 224, of the casing 222 and, in the same manner, in order to reach the first outlet 238a, the downstream pipe 116b extends in a sealed manner through a wall, in this instance a lateral wall 224, of the casing 222.

The heat exchanger 232 comprises a second inlet 236b which is connected in fluid terms to a supply pipe 240 and a second outlet 238b which is connected in fluid terms to a discharge pipe 242. The supply pipe 240 and the discharge pipe 242 ensure that the heat exchanger 232 is supplied with heat exchange fluid and the heat exchange fluid is discharged from the heat exchanger 232.

The supply pipe 240 and the discharge pipe 242 are part of a heat exchange fluid circuit which also comprises a tank in which the heat exchange fluid is stored, a heating system which heats the heat exchange fluid and at least one pump which generates a flow of heat exchange fluid. The heat exchange fluid is driven by the pump in the supply pipe 240 of the tank towards the second inlet 236b passing through the heating system, then after having passed through the heat exchanger 232, the heat exchange fluid joins the tank via the discharge pipe 242.

Preferably, the heat exchange fluid is a fluid which does not represent any risk when mixed with dihydrogen, such as, for example, dinitrogen ($N_2$) at 743 K.

In the embodiments of the invention set out in FIGS. 2 and 3, the second inlet 236b and the second outlet 238b are arranged in the second volume 230b, but a different arrangement is possible.

In order to reach the second inlet 236b, the supply pipe 240 extends in a sealed manner through a wall, in this instance a lateral wall 224, of the casing 222 and, in the same manner, in order to reach the second outlet 238b, the discharge pipe 242 extends in a sealed manner through a wall, in this instance a lateral wall 224, of the casing 222.

The heat exchanger 232 thus ensures a heat exchange between the heat exchange fluid which is cooled and the dihydrogen which is heated.

The casing system 220, 320 also comprises in the first volume 230a a first pressure sensor 244a and in the second volume 230b a second pressure sensor 244b. The first pressure sensor 244a determines the pressure in the first volume 230a and the second pressure sensor 244b determines the pressure in the second volume 230b.

The casing system 220, 320 also comprises a control unit 50 which is connected to the pressure sensors 244a-b and which is arranged to receive the pressure values measured by the pressure sensors 244a-b.

The control unit 50 is also connected to the upstream solenoid valve 122a and downstream solenoid valve 112b and controls them in terms of opening and closing.

The control unit 50 regularly receives the values which are transmitted by the pressure sensors 244a-b and which are representative of the pressures in the volumes 230a-b.

The control unit 50 compares two successive values of the pressure in each volume 230a-b.

The control unit 50 is arranged to detect whether the deviation in absolute value between two successive values of the pressure in the first volume 230a is less than a first threshold (positive case), that is to say, if the pressure in the first volume 230a remains stable or whether the deviation in absolute value between the two successive values is greater than a second threshold (negative case), that is to say, if the pressure in the first volume 230a varies. The second threshold is greater than or equal to the first threshold.

In the same manner, the control unit 50 is arranged to detect whether the deviation in absolute value between two successive values of the pressure in the second volume 230b is less than another first threshold (positive case), that is to say, if the pressure in the second volume 230b remains stable, or whether the deviation in absolute value between the two successive values is greater than another second threshold (negative case), that is so say, if the pressure in the second volume 230 varies. The other second threshold is greater than or equal to the other first threshold.

The first threshold and the second threshold and the other first threshold and the other second threshold may be equal at least in some cases or all different. When the control unit 50 detects at least one negative case for the first volume 230a or the second volume 230b, that is to say, a deviation in absolute value between two successive pressure values beyond the second threshold in the first volume 230a or the other second threshold in the second volume 230b, the control unit 50 controls the closure of the upstream solenoid valve 122a and downstream solenoid valve 112b in order to isolate the leak.

When the pressure variation remains below a first threshold for the first volume 230a and the second volume 230b, that is to say, two positive cases, the control unit 50 keeps the upstream solenoid valve 122a and downstream solenoid valve 112b open.

In this manner, in the event of detection of a leak of dihydrogen in the region of the pipes and the connections, or a leak of the sealing of the casing 222, the control unit controls the closure of the solenoid valves 122a-b and the casing 222 is then isolated by stopping the flow of dihydrogen and it may be replaced, emptied and repaired during subsequent maintenance operations.

In the case of leakage in the first volume 230a and to limit the risks of explosion of the casing 222, the casing 222 comprises in the region of a wall of the first volume 230a, in this instance a lateral wall 224, a pressure relief valve 252 which opens either directly to the free air or into a conduit 254 which pipes the gas which escapes towards a location provided for this purpose. The pressure relief valve 252 is calibrated in order to prevent the pressure from exceeding the resistance of the casing 222.

In order to supply the second volume 230b with inert gas, the casing 222 comprises in the region of a wall of the second volume 230b, in this instance a lateral wall 224, an intake 256 to which a source of inert gas under pressure is connected in fluid terms.

In order to empty the second volume 230b, the casing 222 comprises in the region of a wall of the second volume 230b, in this instance a lateral wall 224, a discharge 258 via which the gas contained in the second volume 230b can be discharged.

In order to limit the risks of leaks of dihydrogen along the pipe 116, it is preferably a dual-walled pipe. For the portions of the pipe 116 which are located in the casing 222, however, it is possible to use single-walled pipes in order to simplify production.

In the first embodiment of the invention, the separation wall 234 comprises an edge 260 which is fixedly joined to the walls of the casing 222, in this instance lateral walls 224, and which extend inside the first volume 230a.

The separation wall 234 also comprises a central wall 262 which extends around the heat exchanger 232 and which is fixedly joined thereto. The central wall 262 is in this instance parallel with the edge 260.

The separation wall 234 also comprises a connection wall 264 which extends between the edge 260 and the central wall 262 which is fixed, on the one hand, in abutment against a face of the edge 260 which is orientated towards the second volume 230b and, on the other hand, in abutment against a face of the central wall 262 which is orientated towards the second volume 230b. The connection wall 264 is thus arranged at the side of the second volume 230b relative to the edge 260 and the central wall 262. The fixing is carried out, for example, using clamping screws or weld spots or any other appropriate fixing means. The connection wall 264 is in this instance parallel with the edge 260 and the central wall 262.

The position of the connection wall 264 at the side of the second volume 230b prevents the fixing means from working in a separating manner and enables the connection wall 264 to be pressed against the edge 260 and the central wall 262 as a result of the pressure difference between the two volumes 230a-b.

Sealing joints may be arranged between the edge 260 and the connection wall 264, on the one hand, and between the central wall 262 and the connection wall 264, on the other hand.

In the second embodiment of the invention, the separation wall 334 comprises an edge 360 which is fixedly joined to the walls of the casing 222, in this instance lateral walls 224, and which extends inside the first volume 230a.

The separation wall 234 also comprises a central wall 362 which extends around the heat exchanger 232 and which is fixedly joined thereto. The central wall 362 is in this instance parallel with the edge 260. The central wall 362 is fixed in abutment against a face of the edge 360 which is orientated towards the second volume 230b. The central wall 362 is thus arranged at the side of the second volume 230b relative to the edge 360. The fixing is carried out, for example, using clamping screws or weld spots or any other appropriate fixing means.

The position of the central wall 362 at the side of the second volume 230b prevents the fixing means from working in a separating manner and enables the central wall 362 to be pressed against the edge 360 as a result of the pressure difference between the two volumes 230a-b.

Sealing joints may be arranged between the edge 360 and the central wall 362. According to a specific embodiment, in addition to the pressure sensors 244a-b, the casing system 220, 320 comprises, in each volume 230a-b, at least one additional sensor 274a-b, from a dihydrogen sensor and a dioxygen sensor. Each additional sensor 274a-b is connected to the control unit 50 which receives additional values of the pressures measured by each additional sensor 274a-b in order to compare each additional value received in this manner to an additional threshold and to close the solenoid valves 122a-b if an additional value is greater than the additional threshold. The values of the thresholds in each volume 230a-b may be different.

According to a specific embodiment, the inner faces of the walls 224 and 226 which delimit the first volume 230a are covered with a protection 270 against thermal radiation, such as, for example, a multi-layered thermal insulation. This protection 270 limits the heating inside the first volume 230a as a result of a source of external heat and thus prevents a pressure increase in the event of a leakage.

According to a specific embodiment, the outer faces of the walls 224, 226 and 228 of the casing 222 are covered with a thermal protection 272. This thermal protection 272 limits the heating inside the casing 222 as a result of a source of external heat and thus prevents a pressure increase in the event of a leakage.

According to a specific embodiment of the first embodiment, a plate 276 is fixed between the edge 260 and the central wall 262 at the side opposite the connection wall 264. Symmetrically relative to the connection wall 264, the plate 276 is fixed, on the one hand, in abutment against a face of the edge 260 orientated towards the first volume 230a and, on the other hand, in abutment against a face of the central wall 262 orientated towards the first volume 230a. The plate 276 comprises an insulating layer 278 which is in abutment against the edge 260 and the central wall 262. Such an arrangement contains a potential excess pressure in the first volume 230a in the event of a leakage and prevents the contamination of the second volume 230b and an abrupt increase of the pressure if the dihydrogen passes from the first volume 230a to the second volume 230b, that is to say, from a cold zone to a hot zone.

In the same manner, according to a specific embodiment of the second embodiment, a plate 376 extends around the heat exchanger 232 and is fixedly joined thereto and it is fixed in abutment against the edge 360 at the side opposite the central wall 362, that is to say, in the first volume 230a.

The plate 376 comprises an insulating layer 378 which is in abutment against the edge 360. Such an arrangement contains any excess pressure in the first volume 230a in the event of a leakage and prevents the contamination of the second volume 230b and an abrupt increase of pressure if the dihydrogen passes from the first volume 230a to the second volume 230b, that is to say, from a cold zone to a hot zone.

According to one embodiment, the control unit 50 comprises, in a state connected by a communication bus: a processor or CPU ("Central Processing Unit"); a RAM ("Random Access Memory"); a ROM ("Read Only Memory"); a storage unit such as a hard disc or a storage media reader, such as an SD card reader ("Secure Digital"); at least one communication interface which enables, for example, the control unit to communicate with the solenoid valves, the pumps, the pressure sensors, etcetera.

The processor is capable of carrying out instructions loaded in the RAM from the ROM, an external memory (not illustrated), a storage medium (such as an SD card), or a communication network. When the equipment is switched on, the processor is capable of reading instructions from the RAM and carrying them out. These instructions form a computer program which causes the processor to implement all or some of the algorithms and steps described above.

All or some of the algorithms and steps described above may be implemented in software form by carrying out a set of instructions using a programmable machine, for example, a DSP ("Digital Signal Processor") or a microcontroller, or may be implemented in hardware form by a dedicated machine or component, for example, an FPGA ("Field-Programmable Gate Array") or an ASIC ("Application-Specific Integrated Circuit").

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A casing system which is intended to be mounted between a supply pipe and a discharge pipe in which a heat exchange fluid circulates, the casing system comprising:
   a sealed casing which is divided by a sealed separation wall into a first volume and a second volume, the second volume being filled with a gas which is inert with respect to dihydrogen;
   a vacuum pump which is fluidically connected to the first volume and which is configured, during operation, to generate a reduced pressure in the first volume;
   an upstream pipe along which an upstream solenoid valve is mounted and which is configured to be fluidically connected to a dihydrogen tank;
   a downstream pipe along which a downstream solenoid valve is mounted and which is configured to be fluidically connected to an engine;
   a heat exchanger which is fixed inside the sealed casing through the sealed separation wall and which has a first inlet which is fluidically connected to the upstream pipe downstream of the upstream solenoid valve and a first outlet which is fluidically connected to the downstream pipe upstream of the downstream solenoid valve and which has a second inlet which is configured to be fluidically connected to the supply pipe and a second outlet which is intended to be fluidically connected to the discharge pipe, wherein the first inlet is arranged in the first volume and the first outlet is arranged in the second volume;
   a first pressure sensor in the first volume;
   a second pressure sensor in the second volume;
   a control unit configured to
      receive pressure values measured by the first and second pressure sensors in order to detect when a deviation in absolute value between two successive values of a pressure in the first volume is less than a first first threshold or greater than a first second threshold which is greater than or equal to the first first threshold and to detect when a deviation in absolute value between two successive values of a pressure in the second volume is less than a second first threshold or greater than a second second threshold which is greater than or equal to the second first threshold, and
      close the upstream and downstream solenoid valves when the control unit detects a deviation in absolute value between two successive pressure values beyond the first second threshold in the first volume or the second second threshold in the second volume.

2. The casing system according to claim 1, wherein the sealed casing comprises, in a region of a wall of the first volume, a pressure relief valve.

3. The casing system according to claim 1, wherein the sealed casing comprises, in a region of a wall of the second volume, an intake configured to fluidically connect to a source of inert gas under pressure.

4. The casing system according to claim 1, wherein the sealed casing comprises, in a region of a wall of the second volume, a discharge via which gas is discharged.

5. The casing system according to claim 1,
   wherein the sealed separation wall comprises an edge which is fixedly joined to walls of the sealed casing and which extends inside the first volume, a central wall which extends around the heat exchanger and which is fixedly joined to the heat exchanger, and a connection wall which extends between the edge and the central wall and which is fixed in abutment against a face of the edge which is orientated towards the second volume and in abutment against a face of the central wall which is orientated towards the second volume.

6. The casing system according to claim 1, wherein the sealed separation wall comprises an edge which is fixedly joined to walls of the sealed casing and which extends inside the first volume and a central wall which extends around the heat exchanger and which is fixedly joined to the heat exchanger, wherein the central wall is fixed in abutment against a face of the edge which is orientated towards the second volume.

7. The casing system according to claim 1, further comprising:
   at least one additional sensor arranged in each of the first volume and the second volume, respectively, each of the at least one additional sensors comprising, from a dihydrogen sensor or a dioxygen sensor, and
   wherein the control unit is arranged to receive additional values measured by each additional sensor in order to compare each additional value with an additional threshold and to close the upstream solenoid valve and the downstream solenoid valves if an additional value is greater than the additional threshold.

8. An aircraft comprising:
   a dihydrogen tank,
   an engine,
   the casing system according to claim 1, wherein the upstream pipe extends between the tank and the first inlet of the heat exchanger, wherein the downstream pipe extends between the first outlet of the heat exchanger and the engine, and,
   a heat exchange fluid circuit which comprises a supply pipe fluidically connected to the second inlet of the heat exchanger and a discharge pipe fluidically connected to the second outlet of the heat exchanger.

* * * * *